US007231166B2

(12) United States Patent
Miyaji

(10) Patent No.: US 7,231,166 B2

(45) Date of Patent: Jun. 12, 2007

(54) CONSUMABLE GOODS MANAGEMENT SYSTEM

(75) Inventor: Kazuo Miyaji, Asaka (JP)

(73) Assignee: Fujifilm Corporation, Tokyo (JP)

( * ) Notice: Subject to any disclaimer, the term of this patent is extended or adjusted under 35 U.S.C. 154(b) by 126 days.

(21) Appl. No.: 11/094,238

(22) Filed: Mar. 31, 2005

(65) Prior Publication Data

US 2005/0220462 A1 Oct. 6, 2005

(30) Foreign Application Priority Data

Mar. 31, 2004 (JP) ............................ 2004-107204

(51) Int. Cl.

*G03G 15/00* (2006.01)
*B41J 2/175* (2006.01)
*G06F 15/00* (2006.01)
*G06K 1/00* (2006.01)
*G06K 15/00* (2006.01)

(52) U.S. Cl. ....................... 399/109; 347/86; 358/1.16; 399/24

(58) Field of Classification Search .................. 399/12, 399/24, 109; 358/1.14, 1.16; 347/19, 86; 340/612, 617

See application file for complete search history.

(56) References Cited

U.S. PATENT DOCUMENTS 5,132,729 A * 7/1992 Matsushita et al. ........... 399/24
5,699,091 A * 12/1997 Bullock et al. ............... 347/19
6,158,837 A * 12/2000 Hilton et al. ................. 347/19
6,687,634 B2 * 2/2004 Borg ........................ 347/19 X
6,748,182 B2 6/2004 Yoshida et al.
2002/0025173 A1 * 2/2002 Isobe et al. ................... 399/12
2003/0031475 A1 * 2/2003 Asakura ...................... 399/12

FOREIGN PATENT DOCUMENTS

JP 10-69139 A 3/1998
JP 2002-108147 A 4/2002

* cited by examiner

*Primary Examiner*—Sandra L. Brase
(74) *Attorney, Agent, or Firm*—Sughrue Mion, PLLC

(57) ABSTRACT

The present invention provides a consumable goods management tag, comprising: a rewritable memory for storing remaining quantity data representing a remaining quantity of consumable goods, and a rewrite controlling unit for controlling a rewrite of the remaining quantity data stored in the memory on the basis of a remaining quantity data writing request inputted from outside, carrying out the rewrite of the remaining quantity data responding to increase of the remaining quantity only when a predetermined rewrite condition is fulfilled, and carrying out the rewrite of the remaining quantity data responding to decrease of the remaining quantity even when the rewrite condition is not fulfilled.

29 Claims, 7 Drawing Sheets

CONSUMABLE GOODS MANAGEMENT SYSTEM

BACKGROUND OF THE INVENTION

1. Field of the Invention

The present invention relates to a consumable goods management system and more specifically to a consumable goods management system for preventing a consumable goods management tag from being diverted and enabling fair recycling of the consumable goods management tag.

2. Related Art

Consumable goods, such as a paper stock, ink and toner that supplied to a device using consumable goods, such as a printer and copying machine, are put on the market as they are held in consumable goods holding component such as a dedicated paper tube (a core) and cartridge. In order to make good use of the devices using consumable goods, it is preferable to supply the devices with genuine consumable goods. Counterfeit consumable goods supplied by someone cause a failure in the device. A method for enabling the genuine consumable goods and counterfeit consumable goods to be distinguished by attaching a RFID (radio frequency identification) tag or the like to the holding component and rejecting any consumable goods other than genuine ones in the device has been developed. In this method, diverting of the tag needs to be prevented. Japanese Patent Application Laid-open No. 10-69139 discloses a technique for destroying a tag when a used holding component is removed from the device. Japanese Patent Application Laid-open No. 2002-108147 discloses a technique for preventing a tag to be diverted by having a tag incorporate memory, in which data can be written but cannot to be cleared, and storing a usage history.

SUMMARY OF THE INVENTION

However, the conventional methods have a weakness in requiring a new tag even to properly recycle a consumable goods holding component, for a tag cannot be recycled.

The present invention is adapted in view of the above problem and intends to provide a consumable goods management system for preventing a tag from being diverted and enabling fair recycling of the tag.

In order to achieve the abovementioned object, a consumable goods management tag according to the present invention includes a rewritable memory for storing remaining quantity data representing a remaining quantity of consumable goods, and a rewrite controlling unit for controlling a rewrite of the remaining quantity data stored in the memory on the basis of a remaining quantity data writing request inputted from outside, the rewrite controlling unit for carrying out the rewrite of the remaining quantity data responding to increase of the remaining quantity only when a predetermined rewrite condition is fulfilled, and for carrying out the rewrite of the remaining quantity data responding to decrease of the remaining quantity even when the rewrite condition is not fulfilled.

For example, the remaining quantity data is the data indicating the current quantity of the consumable goods or the data indicating a ratio between the initial quantity of the consumable goods and the current quantity.

For example, the remaining quantity data is the data indicating cumulative consumption of the consumable goods or the data indicating a ratio between the initial quantity of the consumable goods and the cumulative consumption. The remaining quantity is represented by the difference between the initial quantity and the cumulative consumption.

A consumable goods holding component according to the present invention holds consumable goods and includes the consumable goods management tag.

A device using consumable goods according to the present invention includes a consumable goods consuming unit for receiving the consumable goods holding component and consuming the consumable goods from the consumable goods holding component, a consumption data outputting unit for outputting the remaining quantity data writing request in accordance with a consumption of the consumable goods in the consumable goods consuming unit to the consumable goods management tag, a remaining quantity data reading unit for reading the remaining quantity data from the memory, and a remaining quantity management unit for forbidding the operation of the consumable goods consuming unit when the remaining quantity represented by the remaining quantity data is less than a predetermined value.

A device using consumable goods according to the present invention includes a consumable goods consuming unit for receiving the consumable goods holding component and consuming the consumable goods from the consumable goods holding component, a remaining quantity data reading unit for reading the remaining quantity data from the memory, a consumption management unit for recording a cumulative consumption of the consumable goods in the consumable goods consuming unit after the consumable goods holding component is received and forbidding the consumable goods consuming unit to operate when the difference between the cumulative consumption and the remaining quantity represented by the remaining quantity data when the consumable goods holding component was received is less than a predetermined value, and a consumption data outputting unit for outputting the remaining quantity data writing request in accordance with the cumulative consumption to the consumable goods management tag.

Preferably, the device using consumable goods further includes a remaining quantity measuring unit for measuring the remaining quantity of the consumable goods held in the consumable goods holding component, and a remaining quantity comparing unit for forbidding the consumable goods consuming unit to operate when the remaining quantity measured by the remaining quantity measuring unit is more than the remaining quantity represented by the remaining quantity data by a predetermined permissible difference.

Also preferably, the device using consumable goods further includes a warning unit for warning a user that the remaining quantity comparing unit forbid the consumable goods consuming unit to operate.

A consumable goods supplying device according to the present invention includes a consumable goods supplying unit for receiving the consumable goods holding component and supplying the consumable goods to the consumable goods holding component, and a supplied quantity data outputting unit for outputting the remaining quantity data writing request in accordance with a supplied quantity of the consumable goods in the consumable goods supplying unit to the consumable goods management tag.

A consumable goods management system according to the present invention includes the consumable goods management tag, the consumable goods holding component, the device using consumable goods and the consumable goods supplying device.

With the present invention, a rewrite of remaining quantity data stored on a consumable goods management tag responding to increase of the remaining quantity of consumable goods held in a consumable goods holding component is carried out only when a predetermined rewrite condition is fulfilled, and a rewrite of remaining quantity data stored on a consumable goods management tag responding to decrease of the remaining quantity is carried out even when the rewrite condition is not fulfilled. The device using consumable goods rewrites remaining quantity data to respond to decrease of the remaining quantity according to a consumption of consumable goods and does not operate when a remaining quantity represented by the remaining data is less than a required quantity. Even if someone supplies counterfeit consumable goods to a used consumable goods holding component, a rewrite of remaining quantity data responding to increase of the remaining quantity is unavailable and the remaining quantity data is still representing the decreased remaining quantity. Thus, the consumable goods holding component is unable to be used. A device using consumable goods, which is usually managed by a user, needs not prepare information or means for fulfilling a rewrite condition. This prevents an unauthorized use of information or means for fulfilling the rewrite condition.

In this manner, the present invention can prevents a consumable goods management tag from being diverted and enable fair recycling of the consumable goods management tag.

DETAILED DESCRIPTION OF THE PREFERRED EMBODIMENTS

Preferable embodiments of a consumable goods management system according to the present invention will be described in detail with reference to the appended figures.

Figure 1:
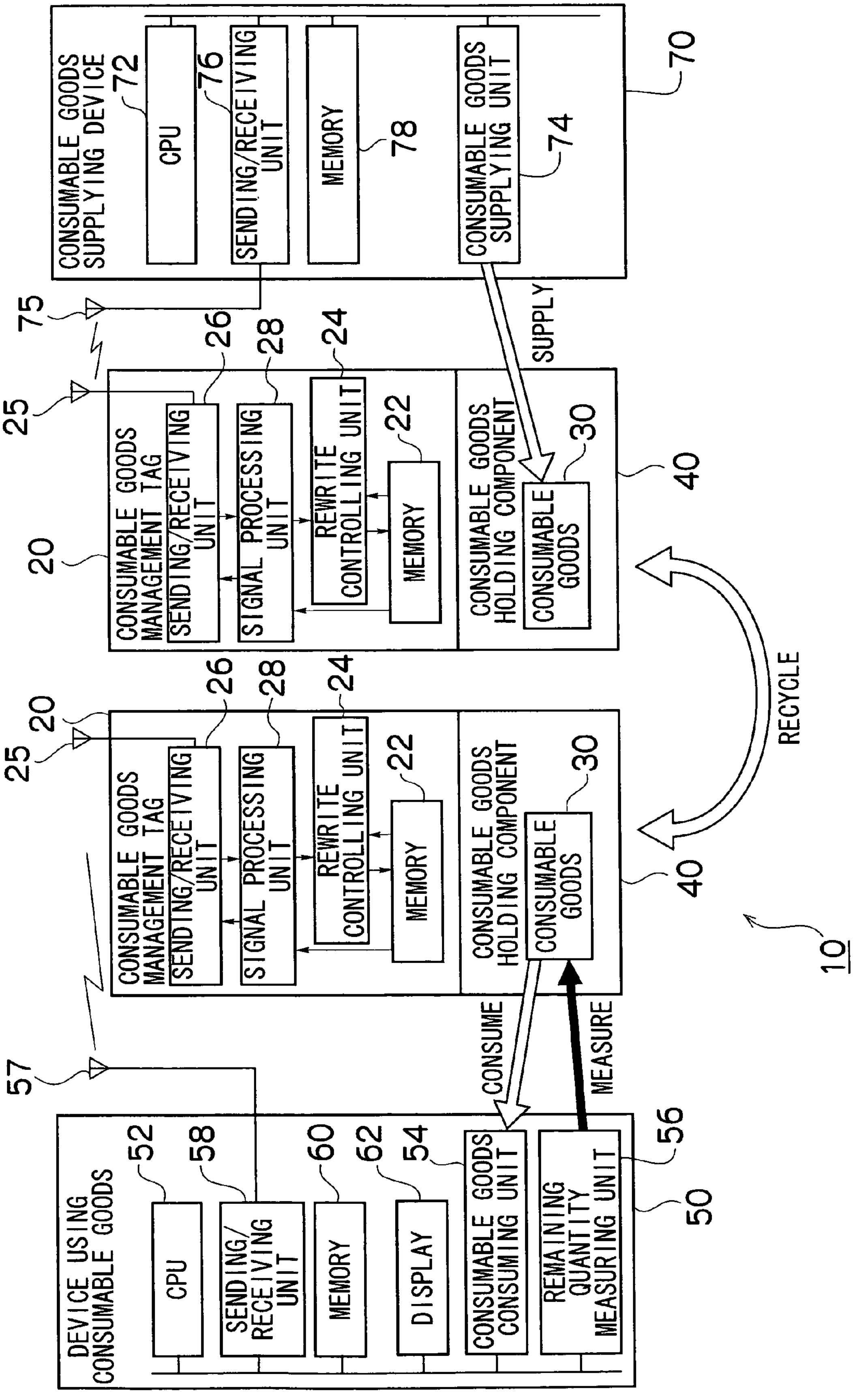
FIG. 1 is a schematic view illustrating an embodiment of a consumable goods management system according to the present invention.

FIG. 1 is a schematic view illustrating consumable goods management system 10 according to an embodiment of the present invention. A consumable goods management system 10 mainly includes a consumable goods management tag 20 such as a RFID tag, a consumable goods holding component 40 attached with the consumable goods management tag 20 and holds consumable goods 30, a device using consumable goods 50 for consuming consumable goods 30 from the consumable goods holding component 40, and a consumable goods supplying device 70 for supplying the consumable goods 30 to a new or a used consumable goods holding component 40. Usually, the device using consumable goods 50 is a device managed by a user, while the consumable goods supplying device 70 is a device managed by a qualified consumable goods supplier. Consumable goods management tag 20 and consumable goods holding component 40 are recycled in the consumable goods supplying device 70 and device using consumable goods 50.

Figure 2:
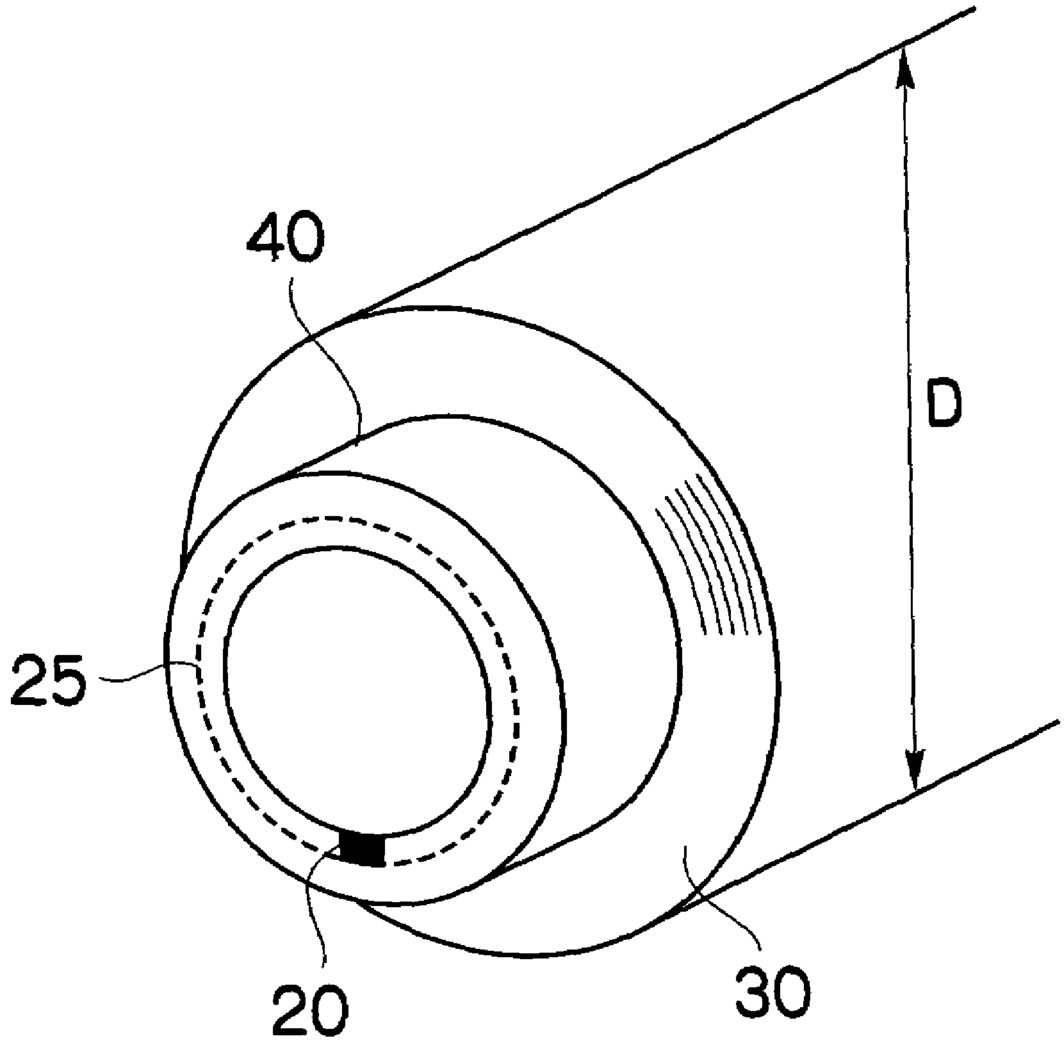
FIG. 2 is a view of an embodiment of a consumable goods management tag, consumable goods and consumable goods holding component according to the present invention.

In the embodiment shown in FIG. 2, the consumable goods 30 are heat sensitive paper and the consumable goods holding component 40 is a paper tube rolled with the heat sensitive paper. At the end of the paper tube (consumable goods holding component 40) holding heat sensitive paper (consumable goods 30), a consumable goods management tag 20 including an antenna 25 is attached. In this embodiment, the device using consumable goods 50 is a printer for heat sensitive paper, and the consumable goods supplying device 70 is a heat sensitive paper supplying device for rolling (supplying) heat sensitive paper (consumable goods 30) on a new or a used paper tube (consumable goods holding component 40). However, the type of consumable goods 30 to be used in consumable goods management system 10 is not specifically limited and any type of consumable goods that are on the market with held on consumable goods holding component 40 such as a dedicated tube or a dedicated cartridge can be used. If the device using consumable goods 50 is a thermal-transfer printer, the type of the consumable goods 30 is an ink ribbon and the consumable goods holding component 40 is an ink ribbon cartridge. If the device using consumable goods 50 is an ink jet printer, the type of the consumable goods 30 is ink and the consumable goods holding component 40 is an ink cartridge. If the device using consumable goods 50 is a copying machine, the type of the consumable goods 30 is a toner and the consumable goods holding component 40 is a toner cartridge. If the device using consumable goods 50 is a fuel battery, the type of the consumable goods 30 is fuel and the consumable goods holding component 40 is a fuel cartridge.

Next, the consumable goods management tag 20 will be described with reference to FIG. 1. A consumable goods management tag 20 mainly includes a volatile rewritable memory 22, a rewrite controlling unit 24 for controlling a rewrite of data stored in the memory 22, a sending/receiving unit 26 for sending/receiving data to/from outside via an antenna 25, and a signal processing unit 28 for sending data read from the memory 22 to the sending/receiving unit 26 and sending data received by the sending/receiving unit 26 to the rewrite controlling unit 24. The memory 22 stores ID data such as a manufacturer's code, an authentication password or an authentication command to be described later, remaining quantity data representing a remaining quantity of consumable goods 30 held in a consumable goods holding component 40 and the like. Well-known methods prevent ID data, an authentication password or an authentication command from being tampered. Remaining quantity data may be data indicating the remaining quantity, which is the current quantity of consumable goods 30 obtained by subtracting a cumulative consumption of consumable goods 30 from the initial quantity of consumable goods 30 held in the consumable goods holding component 40 when it is shipped from the factory. However, remaining quantity data is not limited to this and may be data indicating a cumulative consumption, data indicating a ratio between the initial quantity and the current quantity, or data indicating a ratio between the initial quantity and the cumulative consumption.

Figure 3:
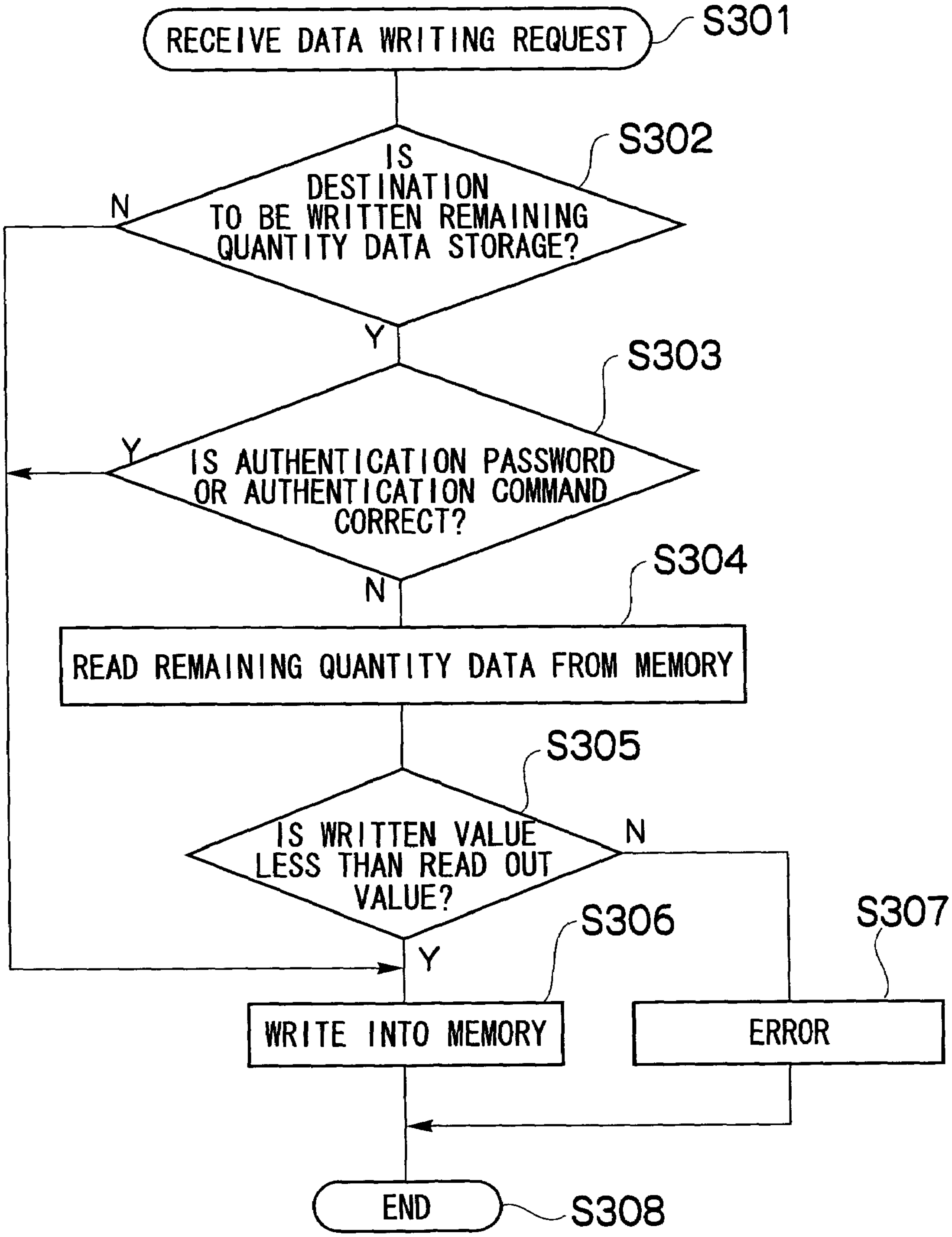
FIG. 3 is a flowchart showing an embodiment of a writing control on a consumable goods management tag according to the present invention.

FIG. 3 is a flowchart showing an embodiment of a control over writing of data in the memory 22 in the rewrite controlling unit 24. When the rewrite controlling unit 24 receives a request to write data in the memory 22 from outside via the antenna 25, sending/receiving unit 26 and signal processing unit 28 (S301), it determines whether the destination of the data designated by the writing request is a remaining quantity data storage in the memory 22 or not (S302). When the rewrite controlling unit 24 determines that the destination of the data designated by the data writing request is not a remaining quantity data storage at S302, it writes the data in a designated storage in the memory 22 in accordance with the writing request (S306) and finishes the writing control (S308).

When the destination of the data designated by the data writing request is a remaining quantity data storage in the memory 22, the writing request is a remaining quantity data writing request. Usually, the device using consumable goods 50 consumes consumable goods 30 from the consumable goods holding component 40 and outputs a remaining quantity data writing request responding to decrease of the remaining quantity of consumable goods 30 in accordance with the consumption (i.e., decreasing the current quantity or a ratio of the current quantity to its initial quantity stored in the memory 22 or increasing a cumulative consumption or a ratio of the cumulative consumption to its initial quantity stored in the memory 22), and the consumable goods supplying device 70 supplies consumable goods 30 to the consumable goods holding component 40 and outputs a remaining quantity data writing request responding to increase of the remaining quantity of consumable goods 30 in accordance with the consumption (i.e., increasing the current quantity or a ratio of the current quantity to its initial quantity stored in the memory 22 or decreasing a cumulative consumption or a ratio of the cumulative consumption to its initial quantity stored in memory 22) along with a predetermined password to authenticate a rewrite of the remaining quantity data. Or, a consumable goods supplying unit 74 may supply the maximum quantity of consumable goods 30 that can be held by consumable goods holding component 40 to the consumable goods holding component 40 and output an authentication command for initializing remaining quantity data stored in the memory 22 as a remaining quantity data writing request so as to make the current quantity stored in the memory 22 100% or a cumulative consumption stored in the memory 22 0%.

When the rewrite controlling unit 24 determines that the destination of the data designated by the data writing request is remaining quantity data storage at S302, it determines whether a password or a command for authenticating a rewrite of remaining quantity data is attached to the writing request or not (S303). The rewrite controlling unit 24 compares a password or a command attached to the writing request with an authenticating password or an authenticating command stored in the memory 22. When the rewrite controlling unit 24 determines that the password or the command is correct, it decides that the predetermined rewrite condition is fulfilled and rewrites remaining quantity data according to the writing request (S306) and finishes the writing control (S308). Rewriting of remaining quantity of data carried out by the rewrite controlling unit 24 includes initialization of remaining quantity data according to an authentication command.

When the rewrite controlling unit 24 determines NO, as a password or a command is not attached to a writing request or not correct, at S303 and decides that the predetermined rewrite condition is not fulfilled, it reads remaining quantity data currently stored in the memory 22 (S304) and determines whether or not a remaining quantity (written value) of consumable goods 30 indicated by remaining quantity data that is requested to be written is less than a remaining quantity (read out value) of consumable goods 30 indicated by remaining quantity data read from the memory 22 (S305). When the rewrite controlling unit 24 determines that a written value is less than a read out value at S305, it rewrites remaining quantity data stored in the memory 22 according to the writing request (S306). When the rewrite controlling unit 24 determines NO at S305, it decides it an error (S307) and finishes the writing control (S308) without rewriting the remaining quantity data. In other words, when a predetermined rewrite condition is not fulfilled as the authentication password or the authentication command is not attached to the writing request or not correct, the rewrite controlling unit 24 rewrites remaining quantity data responding to decrease of the remaining quantity of consumable goods 30 held in the consumable goods holding component 40 but not rewrites the remaining quantity data responding to increase of the remaining quantity.

Next, the device using consumable goods 50 will be described with reference to FIG. 1. A device using consumable goods 50 mainly includes a CPU 52 for controlling over the device, a consumable goods consuming unit 54 for receiving consumable goods holding component 40 and consuming consumable goods 30 from the consumable goods holding component 40, a remaining quantity measuring unit 56 for measuring a remaining quantity of consumable goods 30 held in the consumable goods holding component 40, a sending/receiving unit 58 for sending/receiving various types of data to/from the consumable goods management tag 20 attached to the consumable goods holding component 40 via an antenna 57, a memory 60 for storing various types of data, and a display 62 for displaying various types of view.

Figure 4:
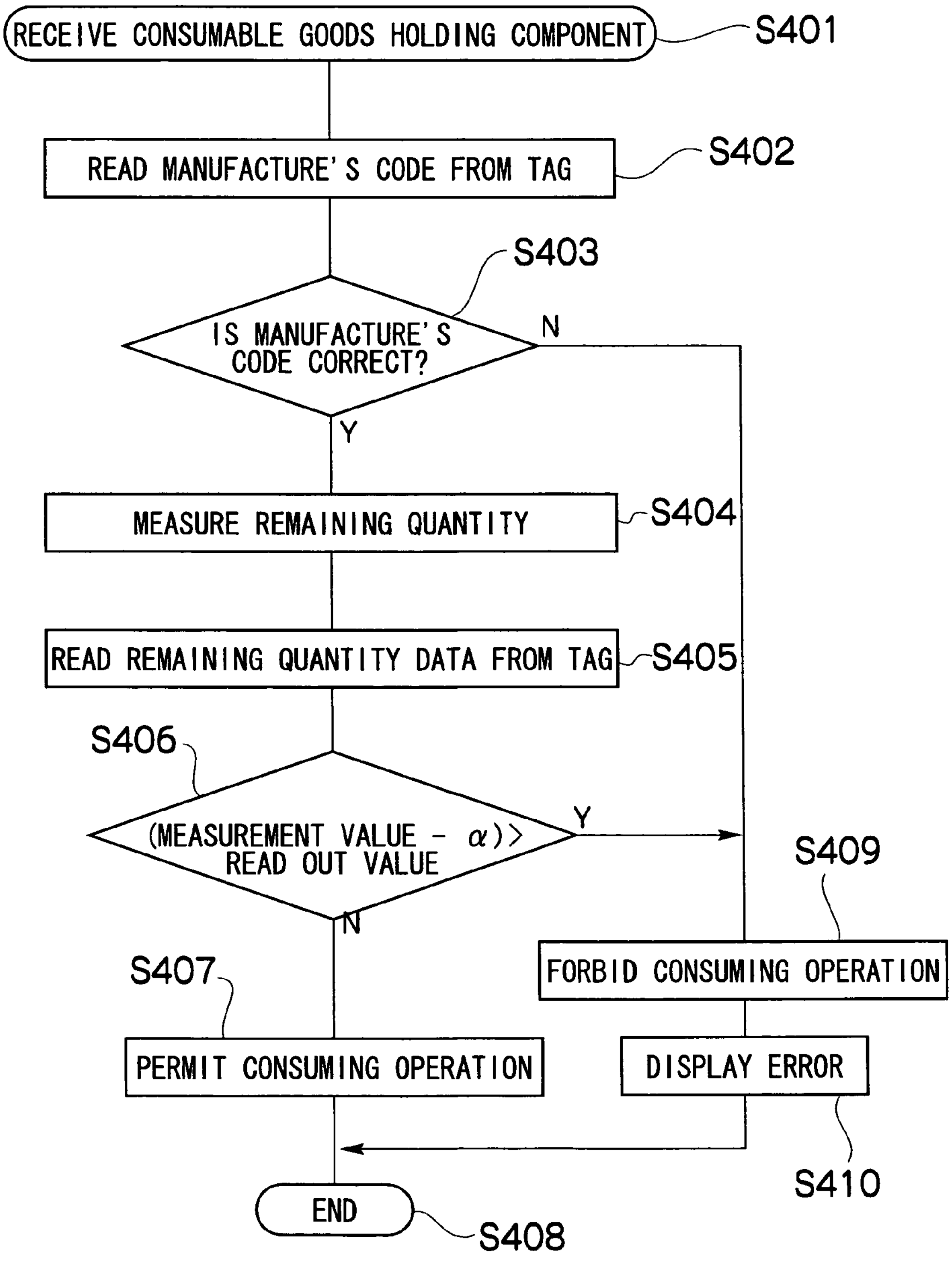
FIG. 4 is a flowchart showing an embodiment of a control when a device using consumable goods according to the present invention receives a consumable goods holding component.

FIG. 4 is a flowchart showing an embodiment of processes carried out by the CPU 52 when the consumable goods consuming unit 54 receives the consumable goods holding component 40. When the consumable goods consuming unit 54 receives the consumable goods holding component 40 (S401), the CPU 52 reads the manufacture's code from the consumable goods management tag 20 attached to the consumable goods holding component 40 through the sending/receiving unit 58 (S402) and determines whether the read manufacture's code is correct or not (S403). If the read manufacture's code is not correct, it is assumed that consumable goods management tag 20, the consumable goods holding component 40 and consumable goods 30 are counterfeit. Use of counterfeit consumable goods 30 causes a failure of the consumable goods consuming unit 54. When the CPU 52 determines NO at S403, it forbids the consumable goods consuming unit 54 to operate (S409), displays an error message or the like on the display 62 for asking a user to change the counterfeit one to genuine one for the consumable goods holding component 40 (S410), and finishes the process (S408). Just after S409, the CPU 52 may output error information to the consumable goods management tag 20 through the sending/receiving unit 58 and have it written in the memory 22. In this case, use of the consumable goods management tag 20 written with error information and the consumable goods holding component 40 including the consumable goods management tag 20 is forbidden in the device using consumable goods 50 and the consumable goods supplying device 70.

When the CPU 52 determines that the read manufacture's code is correct at S403, it measures a remaining quantity of consumable goods 30 held in the consumable goods holding component 40 via the remaining quantity measuring unit 56 (S404). When the type of consumable goods 30 is heat sensitive paper rolled on the consumable goods holding component 40 (paper tube), the remaining quantity measuring unit 56 measures the diameter D of the rolled paper (see FIG. 2), for example. When the type of consumable goods 30 is gas, liquid, powder or the like held in the consumable goods holding component (cartridge) 40, the remaining quantity measuring unit 56 measures a pressure, a volume, a mass of consumable goods 30, for example. When the consumable goods holding component 40 has an indicator indicating a remaining quantity of its holding consumable goods 30 in a mechanical or electrical way, the remaining quantity measuring unit 56 may measure the remaining quantity by reading the indicator.

Then, the CPU 52 reads remaining quantity data from the consumable goods management tag 20 via the sending/receiving unit 58 (S405), and compares a remaining quantity measured at S404 (measurement value) and a remaining quantity represented by the remaining quantity data read at S405 (read out value). As a measurement value actually includes an error of measurement (typically around a few percent of the measurement value), the CPU 52 compares a value obtained from subtracting a predetermined limit deviation tolerance $\alpha$ ($\alpha>0$) from a measurement value and a read out value, and determines whether the measurement value is more than the read out value by more than the predetermined limit deviation tolerance $\alpha$ or not (S406). When the measurement value is determined more than the read out value by more than the predetermined limit deviation tolerance $\alpha$ at S406, consumable goods 30 are assumed as counterfeit wrongly supplied to consumable goods holding component 40. The CPU 52 forbids the consumable goods consuming unit 54 to operate (S409), displays an error message or the like on display 62 for asking a user to change the counterfeit one to genuine one for consumable goods holding component 40 (S410), and finishes the process (S408). If the CPU 52 determines NO at S406, consumable goods 30 is assumed as genuine consumable goods. The CPU 52 permits the operation of the consumable goods consuming unit 54 (S407) and finishes the process (S408).

Figure 5:
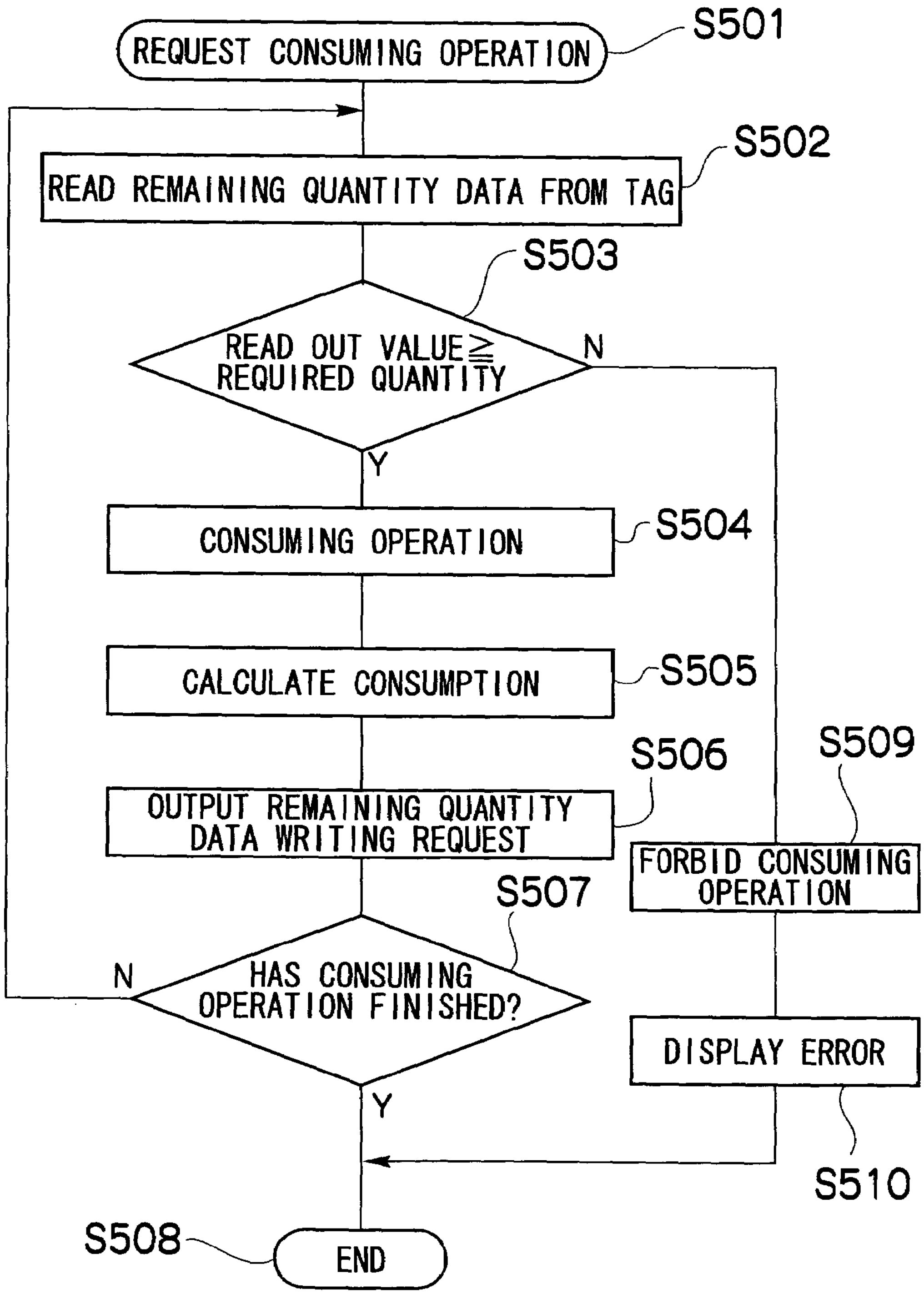
FIG. 5 is a flowchart showing an embodiment of a control when a device using consumable goods according to the present invention operates.

FIG. 5 is a flowchart showing an embodiment of processes carried out by the CPU 52 when the consumable goods consuming unit 54 is about to perform the operation of consuming consumable goods 30 from the consumable goods holding component 40. When CPU 52 receives an operation request from the consumable goods consuming unit 54 (S501), it reads remaining quantity data from the consumable goods management tag 20 via the sending/receiving unit 58 (S502). If S501 is the first operation request after the consumable goods holding component 40 is received, S502 may be omitted as the remaining quantity data is read at S405 shown in FIG. 4. Then, the CPU 52 determines whether or not the remaining quantity represented by the read remaining quantity data (read out value) is more than a required quantity for consumable goods 30 in the operation required by the consumable goods consuming unit 54 (S503). When the CPU 52 determines that the read out value is less than the required quantity at S503, it forbids consumable goods consuming unit 54 to operate (S509), displays an error message or the like on the display 62 for asking a user to change the consumable goods holding component 40 (S510), and finishes the process (S508).

When the CPU 52 determines that the read out value is more than the required quantity at S503, it causes the consumable goods consuming unit 54 to operate (S504) and calculates a consumption of consumable goods 30 in the operation (S505). The CPU 52 may calculate the consumption by receiving data representing the consumption from the consumable goods consuming unit 54 or by measuring a remaining quantity of consumable goods 30 via the remaining quantity measuring unit 56. Then, the CPU 52 outputs a remaining quantity data writing request responding to the consumption calculated at S505 to the consumable goods management tag 20 via the sending/receiving unit 58 (S506). The remaining quantity data writing request is responding to decrease of the remaining quantity of consumable goods 30 held in consumable goods holding component 40 by the consumption calculated at S505. Therefore, as illustrated in FIG. 3, the rewrite controlling unit 24 of the consumable goods management tag 20 rewrites remaining quantity data in accordance with the writing request, even if a predetermined rewrite condition is not fulfilled by attaching an authentication password or an authentication command to the writing request. In order to prevent information or means for fulfilling a predetermined rewrite condition from being diverted, it is preferable for device using consumable goods 50 to hold no information or means for fulfilling a rewrite condition for an authentication password or an authentication command.

Then, the CPU 52 determines whether an operation request for the consumable goods consuming unit 54 finishes or not (S507). If the operation request does not finish, the process returns to S502. If the operation request finishes, it finishes the process (S508).

Figure 6:
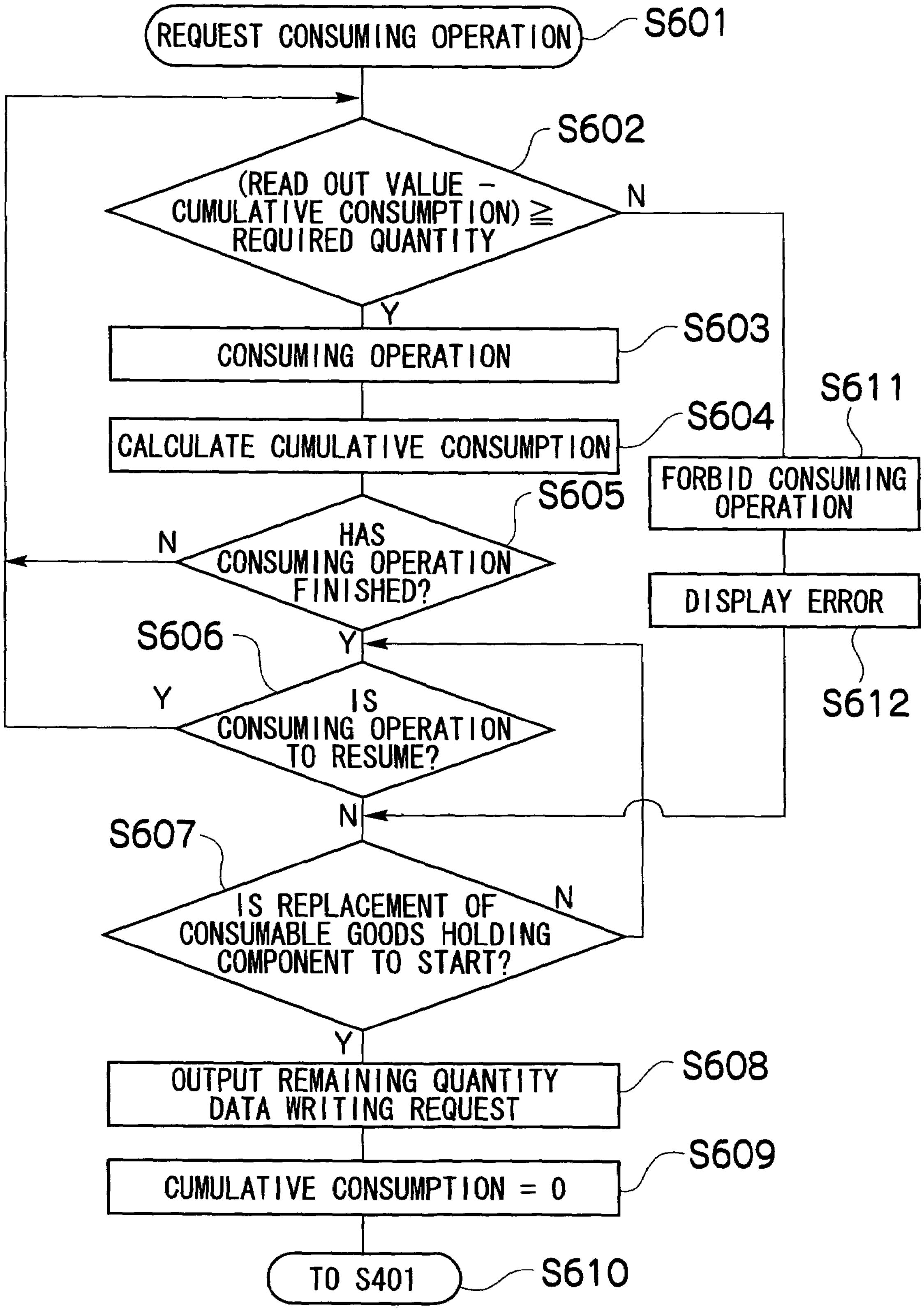
FIG. 6 a flowchart showing another embodiment of a control when a device using consumable goods according to the present invention operates.

FIG. 6 is a flowchart showing another embodiment of processes carried out by the CPU 52 when the consumable goods consuming unit 54 is about to perform the operation of consuming consumable goods 30 from the consumable goods holding component 40. In the example shown in FIG. 6, the CPU 52 stores a cumulative consumption of consumable goods 30 after the consumable goods holding component 40 is received by consumable goods consuming unit 54 in the memory 60. When the CPU 52 receives a operation request from consumable goods consuming unit 54 (S601), it determines whether or not the remaining quantity obtained by subtracting a cumulative consumption from a remaining quantity represented by the remaining quantity data read at S405 shown in FIG. 4 (read out value) is more than a required quantity for consumable goods 30 in an operation required by the consumable goods consuming unit 54 (S602). When the CPU 52 determines that the remaining quantity is less than the required quantity at S602, it forbids the consumable goods consuming unit 54 to operate (S611), displays an error message or the like on the display 62 for asking a user to change the consumable goods holding component 40 (S612), and controls the processes following S607 to be described later.

When the CPU 52 determines that the remaining quantity is equal to or more than the required quantity at S602, it causes the consumable goods consuming unit 54 to perform the operation (S603), calculates a cumulative consumption of consumable goods 30 and has it stored in memory 60 (S604). The CPU 52 may calculate the cumulative consumption by receiving data representing the consumption from the consumable goods consuming unit 54 or by measuring the remaining quantity of consumable goods 30 via the remaining quantity measuring unit 56. Then, the CPU 52 determines whether the operation request from the consumable goods consuming unit 54 has finished or not (S605). If the operation request has not finished, the process returns to S602. If the operation request has finished, the process proceeds to S606. Then, the CPU 52 determines whether the consuming operation of the consumable goods consuming unit 54 is to be resumed or not (S606). If the operation is to be resumed, the process returns to S602. If the operation is not to be resumed, the process proceeds to S607.

At S607, the CPU 52 determines whether replacement of the consumable goods holding component 40 is to start or not. If the replacement is not to start, the process returns to S606. If the replacement is to start, CPU 52 proceeds to S608. Then, CPU 52 outputs a remaining quantity data writing request responding to the cumulative consumption calculated at S604 to the consumable goods management tag 20 via the sending/receiving unit 58 (S608). The remaining quantity data writing request is responding to decrease of the remaining quantity of consumable goods 30 held in the consumable goods holding component 40 by the cumulative consumption calculated at S604. Therefore, as illustrated in FIG. 3, the rewrite controlling unit 24 of the consumable goods management tag 20 rewrites remaining quantity data in accordance with the writing request, even if a predetermined rewrite condition is not fulfilled by attaching an authentication password or an authentication command to the writing request. In order to prevent information or means for fulfilling a predetermined rewrite condition from being diverted, it is preferable for the device using consumable goods 50 to hold no information or means for fulfilling a rewrite condition for an authentication password or an authentication command. Then, the CPU 52 resets the cumulative consumption stored in the memory 60 to 0 (S609). When the replacement of the consumable goods holding component 40 has finished, the process proceeds to S401 shown in FIG. 4 (S610).

Next, the consumable goods supplying device 70 will be described with reference to FIG. 1. A consumable goods supplying device 70 mainly includes a CPU 72 for controlling over the device, a consumable goods supplying unit 74 for receiving the consumable goods holding component 40 and supplying consumable goods 30 to consumable goods holding component 40, a sending/receiving unit 76 for sending/receiving various types of data to/from the consumable goods management tag 20 attached to the consumable goods holding component 40 via the antenna 75, and a memory 78 for storing various types of data.

Figure 7:
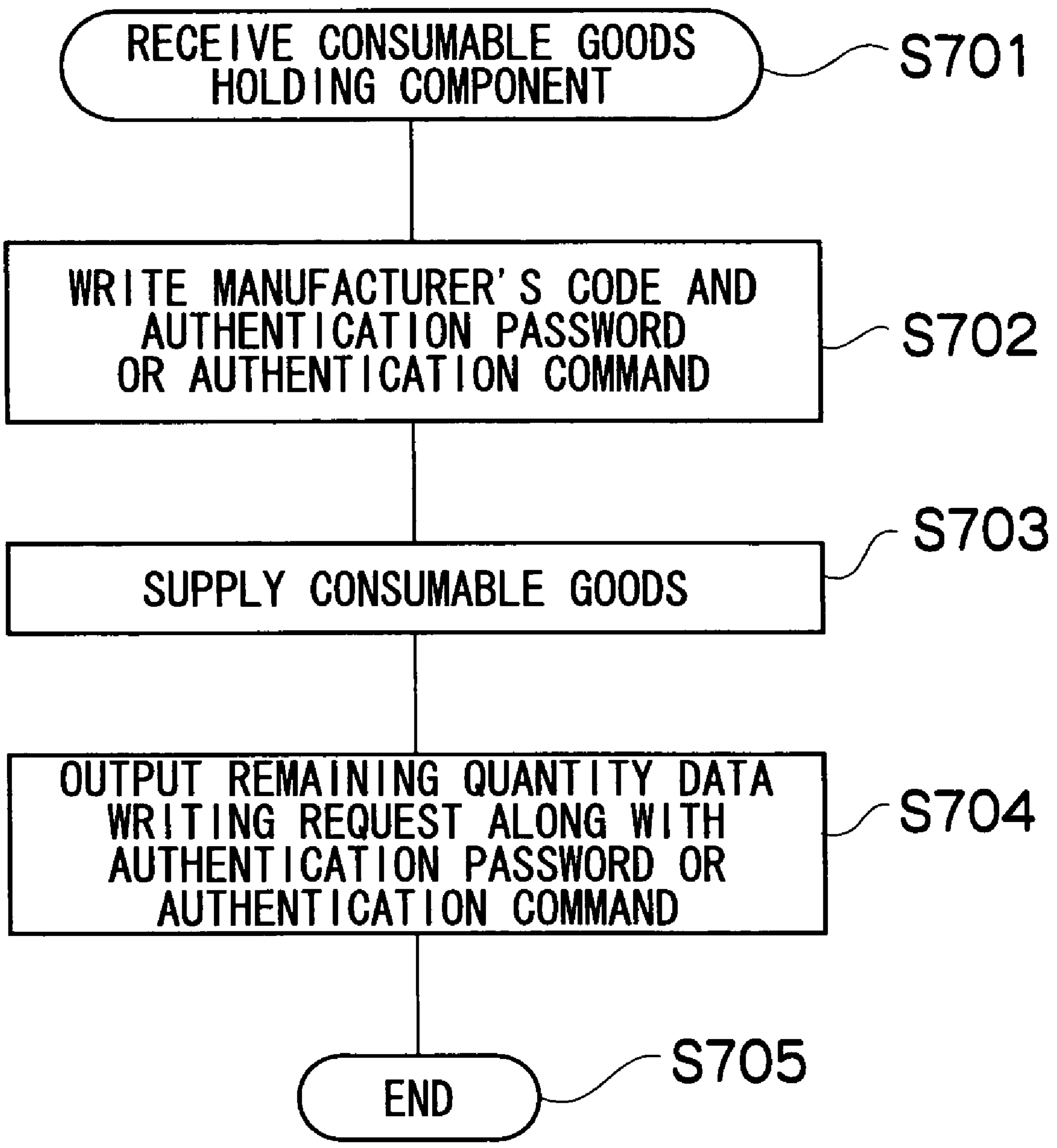
FIG. 7 is a flowchart showing an embodiment of a control when a consumable goods supplying device according to the present invention operates.

FIG. 7 is a flowchart showing an embodiment of processes carried out by the CPU 72 when the consumable goods supplying unit 74 receives the consumable goods holding component 40. When consumable goods supplying unit 74 receives the consumable goods holding component 40 (S701), CPU 72 writes the manufacturer's code and the authentication password or the authentication command illustrated in FIG. 3 in memory 22 of consumable goods management tag 20 via sending/receiving unit 76 (S702). If consumable goods management tag 20 and the consumable goods holding component 40 has used and the manufacturer's code and the authentication password or the authentication command have been written in the memory 22, S702 may be omitted.

Then, the CPU 72 causes consumable goods supplying unit 74 to supply consumable goods 30 to the consumable goods holding component 40 (S703), outputs a remaining quantity data writing request responding to the supplied quantity of consumable goods 30 along with the authentication password to the consumable goods management tag 20 via the sending/receiving unit 58 (S704), and finishes the process (S705). The remaining quantity data writing request is responding to increase of the remaining quantity of consumable goods 30 held in the consumable goods holding component 40. However, since the authentication password is attached to the writing request, as illustrated in FIG. 3, the rewrite controlling unit 24 of consumable goods management tag 20 determines that a predetermined rewrite condition is fulfilled and rewrites remaining quantity data stored in memory 22 in accordance with the writing request. Usually, the consumable goods supplying unit 74 supplies the maximum quantity of consumable goods 30 that can be held by the consumable goods holding component 40 to the consumable goods holding component 40. In this case, the remaining quantity data writing request may be a command for initializing remaining quantity data stored in the memory 22 so as to make a remaining quantity stored in the memory 22 100% or a cumulative consumption stored in the memory 22 0%, for example.

S703 is not limited to be executed immediately after S702 and may be executed before S702 or after S704. The consumable goods supplying unit 74 may be adapted as a device separate from other components in the consumable goods supplying device 70 and S703 may be executed at intervals from other processes shown in FIG. 7.

Although a communication between the consumable goods management tag 20 and the device using consumable goods 50, the consumable goods supplying device 70 is carried out by a wireless communication via an antenna in the abovementioned embodiments, the communication may be carried out by a wireless communication in other means including an infrared communication or a wired communication via switches.

What is claimed is:

1. A consumable goods management tag, comprising:

a rewritable memory for storing quantity data representing a remaining quantity of consumable goods, and a rewrite controlling unit for controlling a rewrite of the remaining quantity data stored in the memory on the basis of a remaining quantity data writing request inputted from outside, the rewrite controlling unit for carrying out the rewrite of the remaining quantity data responding to increase of the remaining quantity only when a predetermined rewrite condition is fulfilled, and for carrying out the rewrite of the remaining quantity data responding to decrease of the remaining quantity even when the rewrite condition is not fulfilled.

2. The consumable goods management tag according to claim 1, wherein the remaining quantity data is the data indicating the current quantity of the consumable goods or the data indicating a ratio between the initial quantity of the consumable goods and the current quantity.

3. A consumable goods holding component for holding consumable goods, comprising a consumable goods management tag according to claim 2.

4. A device using consumable goods, comprising:

a consumable goods consuming unit for receiving a consumable goods holding component according to claim 3 and consuming the consumable goods from the consumable goods holding component;

a consumption data outputting unit for outputting the remaining quantity data writing request in accordance with a consumption or the consumable goods in the consumable goods consuming unit to the consumable goods management tag;

a remaining quantity data reading unit for reading the remaining quantity data from the memory; and a remaining quantity management unit for forbidding the operation of the consumable goods consuming unit when the remaining quantity represented by the remaining quantity data is less than a predetermined value.

5. The device using consumable goods according to claim 4, further comprising:

a remaining quantity measuring unit for measuring the remaining quantity of the consumable goods held in the consumable goods holding component; and a remaining quantity comparing unit for forbidding the consumable goods consuming unit to operate when the remaining quantity measured by the remaining quantity measuring unit is more than the remaining quantity represented by the remaining quantity data by a predetermined permissible difference.

6. The device using consumable goods according to claim 5, further comprising a warning unit for warning a user that the remaining quantity comparing unit forbid the consumable goods consuming unit to operate.

7. A device using consumable goods, comprising:

a consumable goods consuming unit for receiving a consumable goods holding component according to claim 3 and consuming the consumable goods from the consumable goods holding component;

a remaining quantity data reading unit for reading the remaining quantity data from the memory;

a consumption management unit for recording a cumulative consumption of the consumable goods in the consumable goods consuming unit after the consumable goods holding component is received and forbidding the consumable goods consuming unit to operate when the difference between the cumulative consumption and the remaining quantity represented by the remaining quantity data when the consumable goods holding component was received is less than a predetermined value; and a consumption data outputting unit for outputting the remaining quantity data writing request in accordance with the cumulative consumption to the consumable goods management tag.

8. The device using consumable goods according to claim 7, further comprising:

a remaining quantity measuring unit for measuring the remaining quantity of the consumable goods held in the consumable goods holding component; and a remaining quantity comparing unit for forbidding the consumable goods consuming unit to operate when the remaining quantity measured by the remaining quantity measuring unit is more than the remaining quantity represented by the remaining quantity data by a predetermined permissible difference.

9. The device using consumable goods according to claim 8, further comprising a warning unit for warning a user that the remaining quantity comparing unit forbid the consumable goods consuming unit to operate.

10. A consumable goods supplying device, comprising:

a consumable goods supplying unit for receiving consumable goods holding component according to claim 3 and supplying the consumable goods to the consumable goods holding component; and a supplied quantity data outputting unit for outputting the remaining quantity data writing request in accordance with a supplied quantity of the consumable goods in the consumable goods supplying unit to the consumable goods management tag.

11. The consumable goods management tag according to claim 1, wherein the remaining quantity data is the data indicating cumulative consumption of the consumable goods or the data indicating a ratio between the initial quantity of the consumable goods and the cumulative consumption, and wherein the quantity is represented by the difference between the initial quantity and the cumulative consumption.

12. A consumable goods holding component for holding consumable goods, comprising a consumable goods management tag according to claim 3.

13. A device using consumable goods, comprising:

a consumable goods consuming unit for receiving a consumable goods holding component according to claim 12 and consuming the consumable goods from the consumable goods holding component;

a consumption data outputting unit for outputting the remaining quantity data writing request in accordance with a consumption of the consumable goods in the consumable goods consuming unit to the consumable goods management tag;

a remaining quantity data reading unit for reading the remaining quantity data from the memory; and a remaining quantity management unit for forbidding, the operation of the consumable goods consuming unit when the remaining quantity represented by the remaining quantity data is less than a predetermined value.

14. The device using consumable goods according to claim 13, further comprising:

a remaining quantity measuring unit for measuring the remaining quantity of the consumable goods held in the consumable goods holding component; and a remaining quantity comparing unit for forbidding the consumable goods consuming unit to operate when the remaining quantity measured by the remaining quantity measuring unit is more than the remaining quantity represented by the remaining quantity data by a predetermined permissible difference.

15. The device using consumable goods according to claim 14, further comprising a warning unit for warning a user that the remaining quantity comparing unit forbid the consumable goods consuming unit to operate.

16. A device using consumable goods, comprising:

a consumable goods consuming unit for receiving a consumable goods holding component according to claim 12 and consuming the consumable goods from the consumable goods holding component;

a remaining quantity data reading unit for reading the remaining quantity data from the memory;

a consumption management unit for recording a cumulative consumption of the consumable goods in the consumable goods consuming unit after the consumable goods holding component is received and forbidding the consumable goods consuming unit to operate when the difference between the cumulative consumption and the remaining quantity represented by the remaining quantity data when the consumable goods holding component was received is less than a predetermined value; and a consumption data outputting unit for outputting the remaining quantity data writing request in accordance with the cumulative consumption to the consumable goods management tag.

17. The device using consumable goods according to claim 16, further comprising:

a remaining quantity measuring unit for measuring the remaining quantity of the consumable goods held in the consumable goods holding component; and a remaining quantity comparing unit for forbidding the consumable goods consuming unit to operate when the remaining quantity measured by the remaining quantity measuring unit is more than the remaining quantity represented by the remaining quantity data by a predetermined permissible difference.

18. The device using consumable goods according to claim 17, further comprising a warning unit for warning a user that the remaining quantity comparing unit forbid the consumable goods consuming unit to operate.

19. A consumable goods supplying device, comprising:

a consumable goods supplying unit for receiving consumable goods holding component according to claim 12 and supplying the consumable goods to the consumable goods holding component; and a supplied quantity data unit for outputting the remaining quantity data writing request in accordance with a supplied quantity of the consumable goods in the consumable goods supplying unit to the consumable goods management tag.

20. A consumable goods holding component for holding consumable goods, comprising a consumable goods management tag according to claim 1.

21. A device using consumable goods, comprising:

a consumable goods consuming unit for receiving a consumable goods holding component according to claim 20 and consuming the consumable goods from the consumable goods holding component;

a consumption data outputting unit for outputting the remaining quantity data writing request in accordance with a consumption of the consumable goods in the consumable goods consuming unit to the consumable goods management tag;

a remaining quantity data reading the remaining quantity data from the memory; and a remaining quantity management unit for forbidding the operation of the consumable goods consuming unit when the remaining quantity represented by the remaining quantity data is less than a predetermined value.

22. The device using consumable goods according to claim 21, further comprising:

a remaining quantity measuring unit for measuring the remaining quantity of the consumable goods held in the consumable goods holding component; and a remaining quantity comparing unit for forbidding the consumable goods consuming unit to operate when the remaining quantity measured by the remaining quantity measuring unit is more than the remaining quantity represented by the remaining quantity data by a predetermined permissible difference.

23. The device using consumable goods according to claim 22, further comprising a warning unit for warning a user that the remaining quantity comparing unit forbid the consumable goods consuming unit to operate.

24. A device using consumable goods, comprising:

a consumable goods consuming unit for receiving a consumable goods holding component according to claim 20 and consuming the consumable goods from the consumable goods holding component;

a remaining quantity data reading unit for reading the remaining quantity data from the memory;

a consumption management unit for recording a cumulative consumption of the consumable goods in the consumable goods consuming unit after the consumable goods holding component is received and forbidding the consumable goods consuming unit to operate when the difference between the cumulative consumption and the remaining quantity represented by the remaining quantity data when the consumable goods holding component was received is less than a predetermined value; and a consumption data outputting unit for outputting the remaining quantity data writing request in accordance with the cumulative consumption to the consumable goods management tag.

25. The device using consumable goods according to claim 24, further comprising:

a remaining quantity measuring unit for measuring the remaining quantity of the consumable goods held in the consumable goods holding component; and a remaining quantity comparing unit forbidding the consumable goods consuming unit to operate when the remaining quantity measured by the remaining quantity measuring unit is more than the remaining quantity represented by the remaining quantity data by a predetermined permissible difference.

26. The device using consumable goods according to claim 25, further comprising a warning unit for warning a user that the remaining quantity comparing unit forbid the consumable goods consuming unit to operate.

27. A consumable goods supplying device, comprising:

a consumable goods supplying unit for receiving consumable goods holding component according to claim 20 and supplying the consumable goods to the consumable goods holding component; and a supplied quantity data outputting unit for outputting the remaining quantity data writing request in accordance with a supplied quantity of the consumable goods in the consumable goods supplying unit to the consumable goods management tag.

28. A consumable goods system, comprising:

a consumable goods management tag, said consumable management tag comprising:

a rewritable memory for storing remaining quantity data representing a remaining quantity of consumable goods, and a rewrite controlling unit for controlling a rewrite of the remaining quantity data stored in the memory on the basis of a remaining quantity data writing request inputted from outside, the rewrite controlling unit for carrying out the rewrite of the remaining quantity data to increase of the remaining quantity only when a predetermined rewrite condition is fulfilled, and for carrying out the rewrite of the remaining quantity data responding to decrease of the remaining quantity even when the rewrite condition is not fulfilled;

a consumable goods holding component for holding consumable goods;

a device using consumable goods, said device using consumable goods comprising:

a consumable goods consuming unit for receiving the consumable goods holding component and consuming the consumable goods from the consumable goods holding component;

a consumption data outputting unit for outputting the remaining quantity data writing request in accordance with a consumption of the consumable goods in the consumable goods consuming unit to the consumable goods management tag;

a remaining quantity data reading unit for reading the remaining quantity data from the memory; and a remaining quantity management unit for the operation of the consumable goods consuming unit when the remaining quantity represented by the remaining quantity data is less than a predetermined value; and a consumable goods supplying device, said consumable goods supplying device comprising:

a consumable goods supplying unit for receiving the consumable goods holding component and supplying the consumable goods to the consumable goods holding component; and a supplied quantity data outputting unit for outputting the remaining quantity data writing request in accordance with a supplied quantity of the consumable goods in the consumable goods supplying unit to the consumable goods management tag.

29. A consumable goods management system, comprising:

a consumable goods management tag, said consumable management tag comprising:

a rewritable memory for storing remaining quantity data representing a remaining quantity of consumable goods, and a rewrite controlling unit for controlling a rewrite of the remaining quantity data stored in the memory on the basis of a remaining quantity data writing request inputted from outside, the rewrite controlling unit for carrying out the rewrite of the remaining quantity data responding to increase of the remaining quantity only when a predetermined rewrite condition is fulfilled, and for carrying out the rewrite of the remaining quantity data responding to decrease of the remaining quantity even when the rewrite condition is not fulfilled;

a consumable goods holding component for holding consumable goods;

a device using consumable goods, said device using consumable goods comprising:

a consumable goods consuming unit for receiving the consumable goods holding component and consuming the consumable goods from the consumable goods holding component;

a remaining quantity data reading unit for reading the remaining quantity data from the memory; and a consumption management unit for recording a cumulative consumption of the consumable goods in the consumable goods consuming unit after the consumable goods holding component is received and forbidding the consumable goods consuming unit to operate when the difference between the cumulative consumption and the remaining quantity represented by the remaining quantity data when the consumable goods holding component was received is less than a predetermined value; and a consumption data outputting unit for outputting the remaining quantity data writing request in accordance with the cumulative consumption to the consumable goods management tag; and consumable goods supplying device, said consumable goods supplying device comprising:

a consumable goods supplying unit for the consumable goods holding component and supplying the consumable goods to the consumable goods holding component; and a supplied quantity data outputting unit for outputting the remaining quantity data writing request in accordance with a supplied quantity of the consumable goods in the consumable goods supplying unit to the consumable goods management tag.

* * * * *